United States Patent
Ayers

(10) Patent No.: US 11,453,026 B2
(45) Date of Patent: Sep. 27, 2022

(54) LAMINATED SLOT DIE ASSEMBLY

(71) Applicant: Illinois Tool Works Inc., Glenview, IL (US)

(72) Inventor: Andrew S. Ayers, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/315,949

(22) PCT Filed: Jul. 12, 2017

(86) PCT No.: PCT/US2017/041707
§ 371 (c)(1),
(2) Date: Jan. 7, 2019

(87) PCT Pub. No.: WO2018/013684
PCT Pub. Date: Jan. 18, 2018

(65) Prior Publication Data
US 2019/0299240 A1 Oct. 3, 2019

Related U.S. Application Data

(60) Provisional application No. 62/362,498, filed on Jul. 14, 2016.

(51) Int. Cl.
*B05C 5/02* (2006.01)
*B29C 48/305* (2019.01)
(Continued)

(52) U.S. Cl.
CPC ............ *B05C 5/0254* (2013.01); *B05B 1/044* (2013.01); *B29C 48/08* (2019.02);
(Continued)

(58) Field of Classification Search
CPC ..... B05C 5/0254; B05C 5/027; B29C 48/305; B29C 48/2566; B29C 48/30; B29C 48/25686; B29C 48/3003
(Continued)

(56) References Cited

U.S. PATENT DOCUMENTS

| | | |
|---|---|---|
| 6,375,099 B1 | 4/2002 | McGuffey |
| 2010/0327074 A1 | 12/2010 | Bondeson et al. |

(Continued)

FOREIGN PATENT DOCUMENTS

| | | |
|---|---|---|
| CN | 101199954 A | 6/2008 |
| CN | 101842166 A | 9/2010 |

(Continued)

OTHER PUBLICATIONS

International Preliminary Report on Patentability issued by International Bureau in connection with PCT/US2017/041707 dated Jan. 15, 2019.

(Continued)

*Primary Examiner* — Christopher S Kim
(74) *Attorney, Agent, or Firm* — Levenfeld Pearlstein, LLC

(57) ABSTRACT

A slot die assembly for dispensing a fluid onto an article includes an adapter body, a shim package and a die plate. The adapter body includes an adapter conduit configured to receive a fluid. The shim package includes a plurality of shim plates having a shim conduit disposed in fluid communication with the adapter conduit and configured to receive the fluid from the adapter conduit. The shim package further includes a connecting conduit disposed in fluid communication with the shim conduit, a reservoir disposed in fluid communication with the connecting conduit, and a slot disposed in fluid communication with the reservoir. The slot is configured to dispense the fluid onto an article. The (Continued)

die plate is disposed in abutting relationship to the shim package.

9 Claims, 3 Drawing Sheets

(51) Int. Cl.
*B29C 48/25* (2019.01)
*B29C 48/30* (2019.01)
*B29C 48/08* (2019.01)
*B05B 1/04* (2006.01)

(52) U.S. Cl.
CPC .... *B29C 48/2566* (2019.02); *B29C 48/25686* (2019.02); *B29C 48/3003* (2019.02); *B29C 48/305* (2019.02); *B05C 5/027* (2013.01)

(58) Field of Classification Search
USPC .......................................... 239/554, 55, 596
See application file for complete search history.

(56) References Cited

U.S. PATENT DOCUMENTS

| | | |
|---|---|---|
| 2012/0219657 A1 | 8/2012 | Kondo |
| 2014/0242283 A1 | 8/2014 | Joos |
| 2015/0352588 A1 | 12/2015 | Lessley et al. |

FOREIGN PATENT DOCUMENTS

| | | |
|---|---|---|
| JP | 2010005508 A | 1/2010 |
| JP | 2015062850 A | 4/2015 |
| WO | 8801542 A1 | 3/1988 |

OTHER PUBLICATIONS

Written Opinion issued by ISA/EPO in connection with PCT/US2017/041707 dated Jan. 15, 2019.
International Search Report and Written Opinion issued by ISA/EPO in connection with PCT/US2017/041707 dated Sep. 21, 2017.
Office Action issued by EPO in connection with EP Patent Application No. 17748969.7 dated Oct. 12, 2021.

LAMINATED SLOT DIE ASSEMBLY

BACKGROUND

Adhesive hot melt systems may include an applicator for applying a hot melt adhesive onto a substrate. Conventional applicators include a supply block, an adapter and a nozzle secured to the adapter. The nozzle may be formed as a die assembly configured as a contact-type nozzle to directly apply the hot melt adhesive to a substrate.

Referring to FIGS. 1-3, a known die assembly 10 may include an adapter 12, a shim 14 having a slot 16 for dispensing an adhesive, and a die plate 18. The shim 14 is disposed between the adapter 12 and the die plate 18. In the known assembly 10, an adhesive is received in the adapter 12 in a plurality of conduits 20 and transported generally in a direction 'D' toward the shim 14 and die plate 18. The shim 14 includes a plurality of fluid openings 22, each fluid opening corresponding to a respective conduit 20 of the adapter 12 and configured to receive the adhesive from the corresponding conduit 20. The die plate 18 includes a plurality of inlets 24, each inlet 24 corresponding to a respective fluid opening 22 of the shim 14 and configured to receive the adhesive from the corresponding fluid opening 22. Each inlet 24 is fluidically connected to a transverse channel 26 formed in the die plate 18, the transverse channel 26 extending in a transverse direction 'T'. The transverse channel 26 is fluidically connected to the slot 16 of the shim 14 so that the adhesive may be received in the slot 16 from the transverse channel 26 and discharged from the die assembly 10. As shown in FIGS. 1-3, the die assembly 10 may include first fasteners 28 to clamp the die assembly together and second fasteners 30 to secure the die assembly to an adjacent component of the applicator.

In the known die assembly, the adapter and die plate are formed from hardened metal or steel. The die plate is machined, typically by milling, to form the plurality of inlets and the transverse channel. However, machining a desired pattern of inlets, including plenums for the adhesive to achieve a desired flow pattern, along with the transverse channel, in the die plate is time consuming, labor intensive and expensive. In other known die assemblies, the desired pattern of inlets, plenums and channels is machined in the adapter, or both the adapter and die plate, which results in the same drawbacks identified above.

Accordingly, it is desirable to provide a slot die assembly that may be more quickly and less expensively manufactured than known die assemblies.

SUMMARY

According to one aspect, there is provided a slot die assembly for dispensing a fluid onto an article. The slot die assembly includes an adapter body having an adapter conduit configured to receive a fluid and a shim package having a plurality of shim plates. A shim conduit is formed in the shim package and is disposed in fluid communication with the adapter conduit. The shim conduit is configured to receive the fluid from the adapter conduit. The shim package further includes a connecting conduit disposed in fluid communication with the shim conduit, a reservoir disposed in fluid communication with the connecting conduit, and a slot disposed in fluid communication with the reservoir. The slot is configured to dispense the fluid from the slot die assembly. The slot die assembly further includes a die plate disposed in abutting relationship to the shim package.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
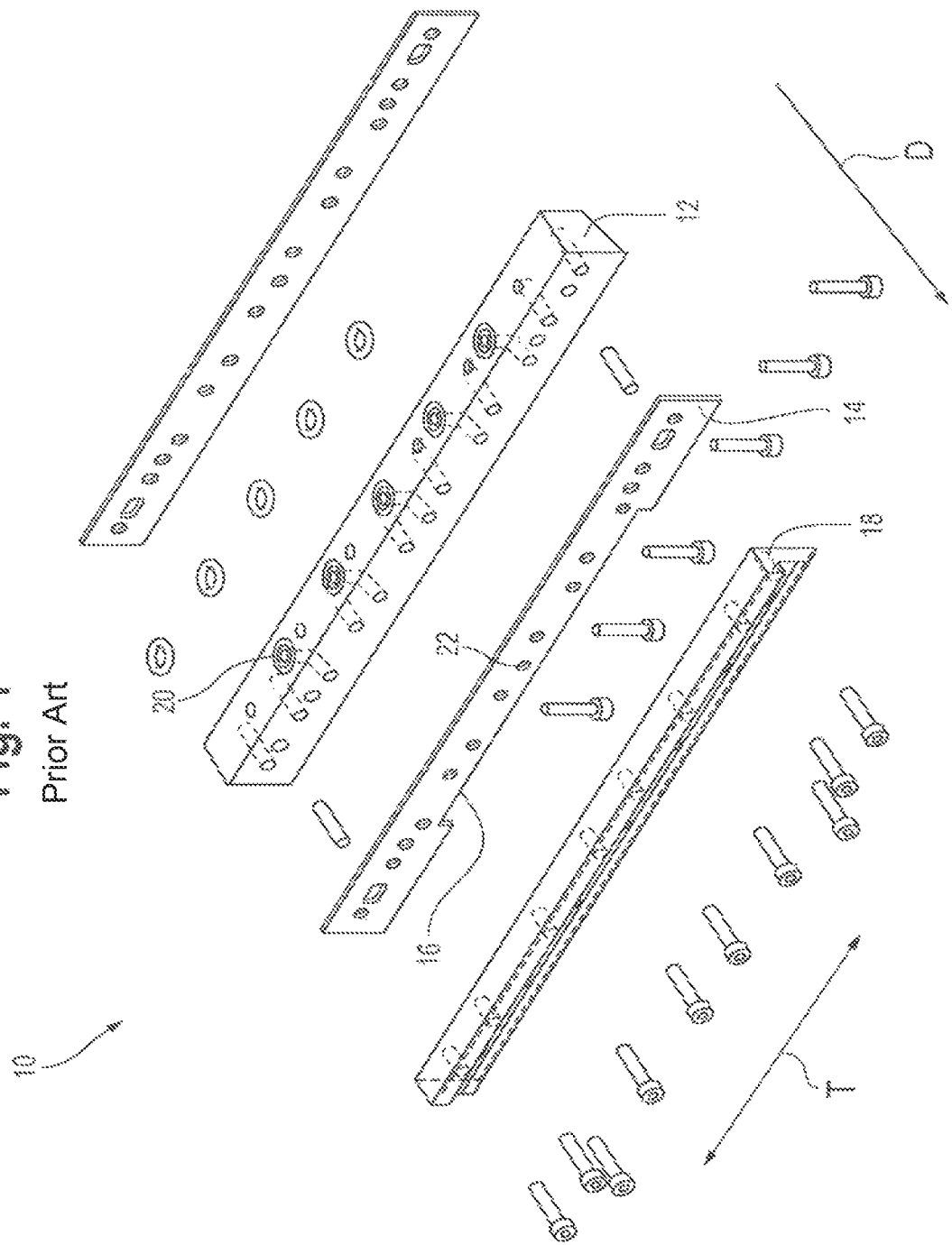
FIG. 1 is an exploded perspective view of a known die assembly.
Figure 2:
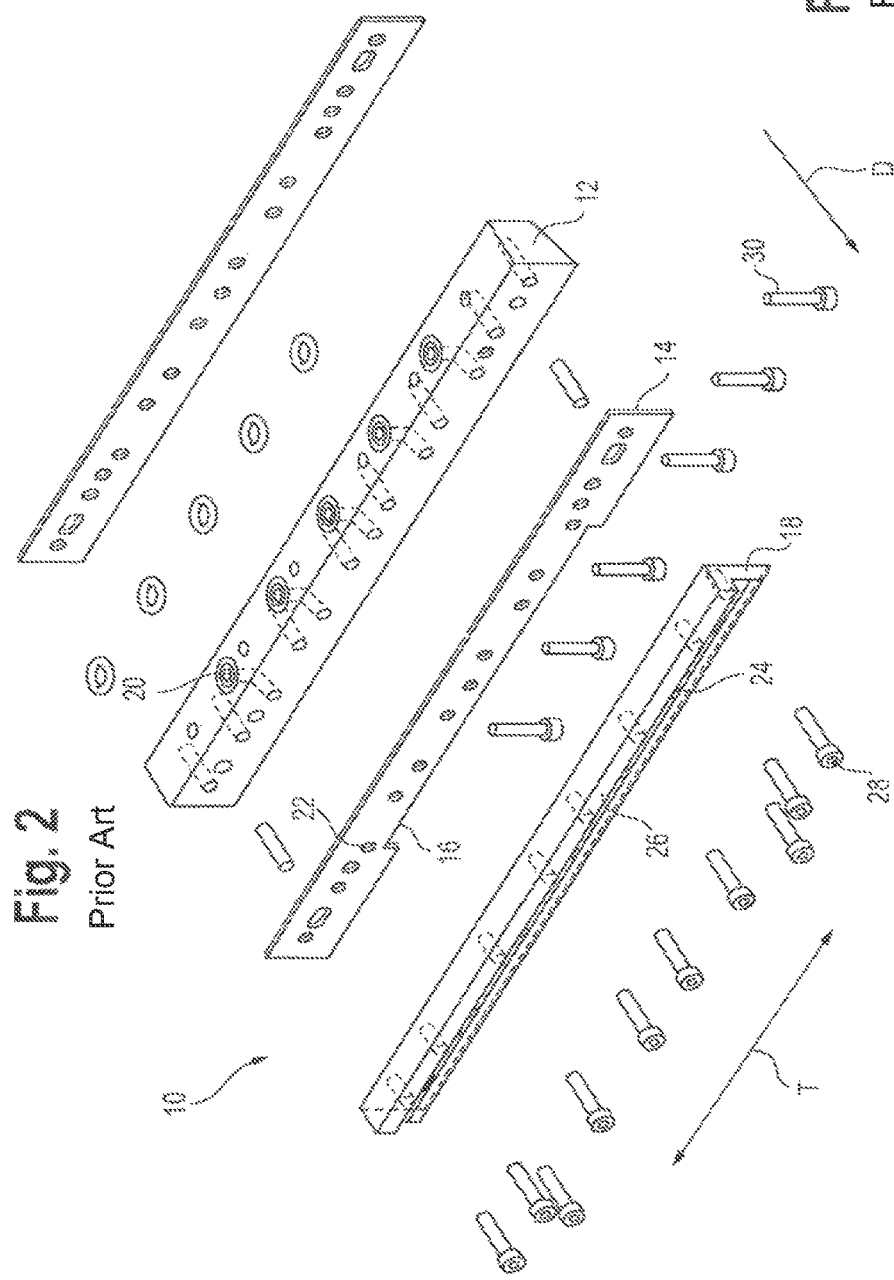
FIG. 2 is an exploded, transparent perspective view of the known die assembly of FIG. 1.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 4:
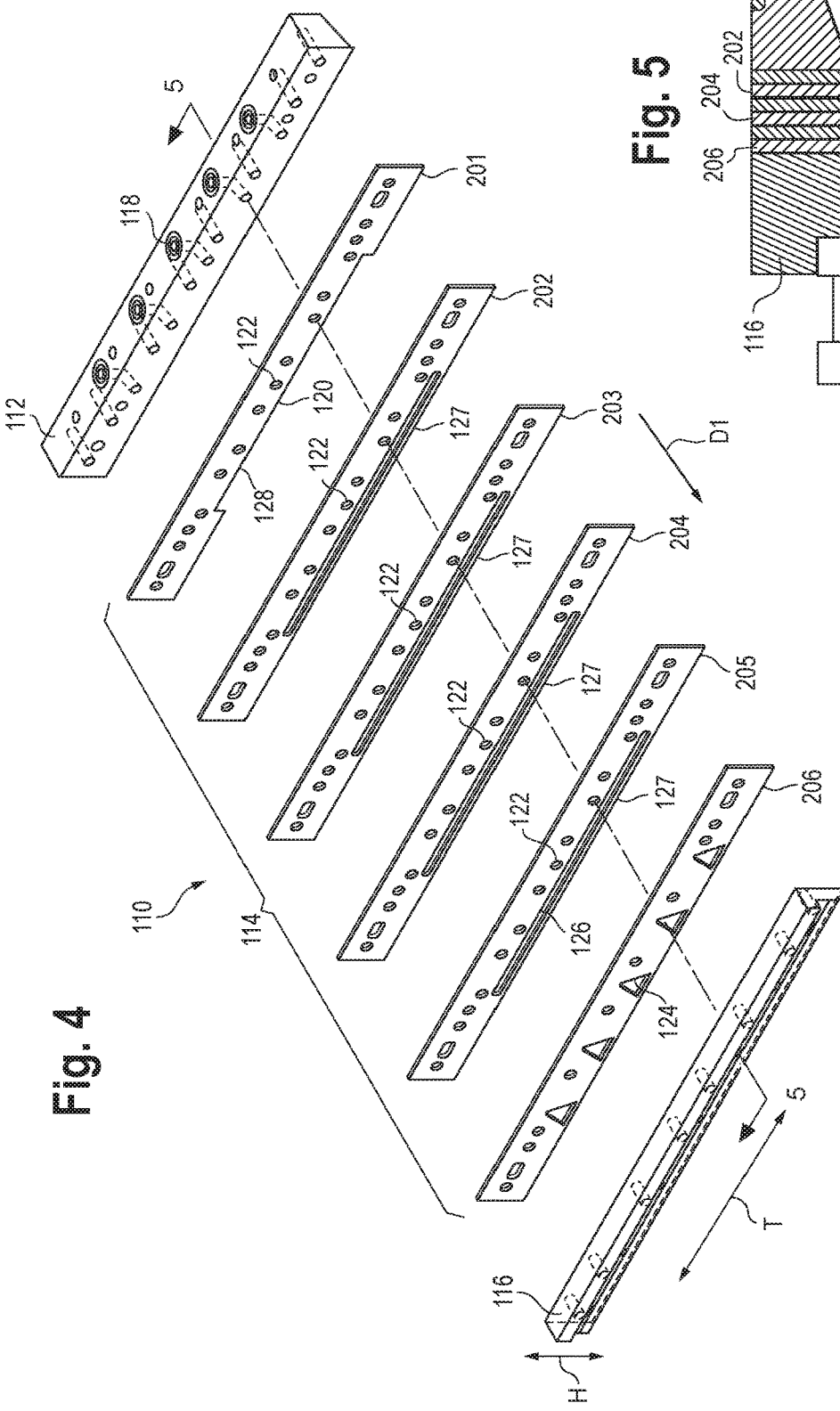
FIG. 4 is an exploded perspective view of a laminated shim slot die assembly according to an embodiment described herein.

FIG. 4 is an exploded perspective view of a laminated shim slot die assembly 110 according to an embodiment described herein. Referring to FIG. 4, the slot die assembly 110 generally includes an adapter body 112, a laminated shim package 114 and a die plate 116 arranged in series in a first direction 'D1'. In one embodiment, the first direction may be generally opposite to a machine direction, where the machine direction is a direction in which a substrate or article moves relative to the slot die assembly 110. The laminated shim package 114 includes a plurality of shims arranged in abutting relationship, and disposed between the adapter body 112 and the die plate 116.

The adapter body 112 includes one or more adapter conduits 118 configured to receive a fluid, for example, a hot melt adhesive, from a supply source (not shown). In one embodiment, the adapter conduits 118 may receive different fluids from different sources. The shim package 114 includes one or more discrete shim conduits 120, each shim conduit 120 formed, collectively, by aligned apertures 122 formed in one or more of the shim plates. In one embodiment, each shim conduit 120 is aligned and disposed in fluid communication with a respective adapter conduit 118, such that the one or more shim conduits 120 are configured to receive the fluid from corresponding adapter conduits 118. The fluid may flow generally in the first direction 'D1' in the shim conduit 120. In other embodiments, the number of shim conduits 120 may not correspond to the number of adapter conduits 118, so long as a desired number of shim conduits 120 are disposed in fluid communication with respective adapter conduits 118.

The shim package 114 further includes one or more discrete connecting conduits 124, each connecting conduit 124 aligned and disposed in fluid communication with a respective shim conduit 120. In one embodiment, the one or more connecting conduits 124 are formed in a shim plate furthest from the adapter body 112. Although shown in only a single shim plate in FIG. 4, it is understood that the one or more connecting conduits 124 may be formed in multiple shim plates. In one embodiment, the one or more connecting conduits 124 extend substantially in a height direction 'H' of the slot die assembly 110. Further, in one embodiment, the one or more connecting conduits 124 may be substantially triangular in shape, and oriented such that fluid is received from the shim conduits 120 at or near an apex of the triangular shape, and flows in the height direction 'H' toward a base of the triangular shape. Thus, as the fluid flows toward the base, it also flows in the transverse direction 'T', corresponding to the increasing transverse width of the connecting conduit 124. Other suitable shapes are envisioned as well, including generally circular, oval, elliptical, square, rectangular, U-shaped, T-shaped, or inverted forms thereof, and the like.

In one embodiment, the shim plate or plates in which the one or more connecting conduits 124 are formed may abut the die plate 116, such that the die plate 116 serves as a backing or support plate and prevents flow of the fluid beyond the shim package 14 in the first direction 'D1'. That is, the die plate 116 may be formed without any fluid conduits. Thus, the die plate 116 may be formed without machining any conduits, channels, plenums or other features in which the fluid may flow. The die plate 116, and/or the adapter body 112 may be made from a hardened steel or other similar, suitable material. In one embodiment, the die plate 116 and adapter body 112 may be formed from a metal or steel material, including, but not limited to, tool steels, such as hardened tool steel and D2 hardened steel, for example.

The shim package 114 further includes one or more discrete reservoirs 126 disposed in one or more of the shim plates. In one embodiment, each reservoir 126 is formed as one or more elongated channels 127 extending in the transverse direction 'T' and aligned with one another in one more shim plates. Each reservoir 126 is disposed in fluid communication with one or more of the connecting conduits 124. Thus, each reservoir 126 of the one or more reservoirs 126 is configured to receive the fluid from one or more connecting conduits 124. Preferably, the reservoir 126 extends in a plurality of the shim plates and is configured to have the fluid flow therein in a direction generally opposite to the first direction 'D1'. In one embodiment, one or more of the reservoirs 126 have a transverse width greater than a transverse width of the connecting conduits 124, so that fluid received in the reservoir 126 also flows in the transverse direction 'T'.

The size or volume of the reservoir 126 may be varied as desired during manufacture and/or assembly of the shim package 114 and slot die assembly 110. A smaller reservoir 126 may allow for faster reaction, with respect to starting and stopping fluid deposition onto an article, while a larger reservoir 126 may provide increased cross-web (i.e., transverse) distribution. Reservoir size or volume may also be varied depending on a viscosity of the fluid. For example, better flow characteristics may be realized for a highly viscous material when a large reservoir is used, whereas a smaller reservoir may be suitable for low-viscosity, flowable material.

The shim package 114 also includes one or more slots 128, through which the fluid may be discharged from the slot die assembly 110 for deposition onto an article (not shown). Each slot 128 is disposed in fluid communication with one or more reservoir 126 and is configured to receive the fluid therefrom. In one embodiment, the slots 128 are formed in the shim plate nearest to and abutting the adapter body 112. However, it is understood that the present disclosure is not limited to this configuration, and that additional shim plates may be disposed between the plate having the slot 128 and the adapter body 112. Further, it is understood that the one or more slots 128 may be formed in multiple shim plates, either adjacent to abutting one another, or spaced apart by other shims. In an embodiment where slots 128 are formed on spaced apart shim plates, an additional conduit (not shown) may be formed in the shim package 114 to deliver fluid to additional slots. In one embodiment, the slots 128 may have a transverse width substantially equal to that of a corresponding reservoir 126 fluidically connected to the slot. In other embodiments, the reservoir 126 may have a larger transverse width than a corresponding slot 128, or vice versa.

In one embodiment, the shim package 114 may include, for example, six shims 201, 202, 203, 204, 205, 206, with a first shim 201 adjacent to and abutting the adapter body 112 and a sixth shim 206 adjacent to and abutting the die plate 116. Second through fifth shims 202, 203, 204, 205, respectively, are disposed in sequence between the first 201 and the sixth 206 shims. In one embodiment, the one or more shim conduits 120 may be formed in the first though fifth shims 201, 202, 203, 204, 205. The connecting conduit 124 may be formed in the sixth shim 206, the reservoir 126 may be formed in the second through fifth shims 202, 203, 204, 205 and the slot 128 may be formed in the first shim 201. It is understood, however, that the present disclosure is not limited to this configuration or the number of shims described above. For example, the shim package 114 may include fewer or additional shims, and the shim conduit 120 and/or reservoir 126 may be formed in fewer or additional shims. Further, the connecting conduit 124 and slot 128 may be formed in multiple shims.

As discussed above, the size or volume of the reservoir 126 may be varied during manufacture of the shim plates and/or assembly of the shim package 114 and slot die assembly 110, depending on desired operating characteristics and/or fluid flow characteristics. For example, the size or volume of the reservoir 126 may be controlled during assembly by adding or removing shim plates having the elongated channels 127 to or from the shim package 114. By adding shim plates with the elongated channels 127, a volume of the reservoir 126 may be increased, while removing shim plates with the elongated channel decreases the volume of the reservoir. For example, with further reference to FIG. 4, additional shim plates formed similarly or identically to the second through fifth plates 202, 203, 204, 205, having the elongated channel 127, may be added between and/or immediately adjacent to and abutting the plates 202, 203, 204, 205 to increase a volume of the reservoir 126. Conversely, one or more of the shim plates 202, 203, 204, 205 may be removed from the shim package to decrease a volume of the reservoir 126. Accordingly, a size or volume of the reservoir 126 may be increased or decreased after manufacture by inserting or removing individual shim plates from the shim package 114. In addition, or alternatively, the size of the elongated channel 127 in the shim plates may be varied during manufacture to achieve a desired size or volume of the reservoir 126.

In operation, according to one embodiment, the die plate 116, shim package 114 and adapter body 112 are clamped together using suitable fasteners, preferably extending through the slot die assembly 110. Accordingly, a fluid flow path defined by the conduits described above may be substantially or entirely sealed against leakage of the fluid. The fluid is received in the one or more adapter conduits 118 of the adapter body 112 and directed generally in the first direction 'D1' to the respective shim conduits 120 of the shim package 114. The fluid flows in the shim conduits 120 generally in the first direction 'D1' to the respective connecting conduits 124. The fluid may flow in the connecting conduits 124 in the height direction 'H' and, and in some embodiment, the transverse direction 'T' as well. The fluid may then be directed from the one or more connecting conduits 124 to the one or more reservoirs 126. In one embodiment, an individual reservoir 126 may receive the fluid from one or more than one of the connecting conduits 124. The fluid may flow in the transverse direction 'T' and a direction generally opposite to the first direction 'D1' in the one or more reservoirs 126 to the one or more slots 128 for dispensing onto the article. In one embodiment, the one or more slots 128 may be formed as laterally or transversely spaced apart slots depending on a desired application pattern of the adhesive.

Accordingly, in the embodiments above, a fluid flow path may be formed by the adapter conduit 118, the shim conduit 120, the connecting conduit 124 and the reservoir 126. The fluid flow path is formed completely within the adapter body 112 and shim package 114, and does not extend into the die plate 116. Thus, the die plate 116 may be mass produced without specific pattern machining for conduits, reservoirs, channels, fluid plenums or other fluid flow path features. In one embodiment, the slot die assembly 110 may include five fluid flow paths. However, the present disclosure is not limited to such a configuration, and the slot die assembly 110 may be manufactured with fewer or additional fluid flow paths as desired.

Further, in embodiments above, the shim package 114 may be modular, such that it is interchangeable with other shim packages 114. Accordingly, different shim packages 114 having different slot 128 configurations (e.g., width, position, number of slots) may be interchangeably used with a single adapter body 112/die plate 116 pair to provide different fluid application patterns.

With further reference to FIG. 4, and as noted above, the die plate 116 may be formed without having any fluid conduits, reservoirs, channels, plenums or similar fluid flow features machined into it. In one embodiment, only fastening bores for clamping the die assembly 110 together, and/or securing the die assembly 110 to an application device may be drilled into die plate 110, such that the die plate 110 is an otherwise a solid, continuous body.

The individual shim plates of the shim package 114 may be formed by laser cutting. For example, the one or more shim conduits 120, the one or connecting conduits 124, the one or more reservoirs 126 and the one or more slots 128 may be laser cut into the shims. Fastening holes or bores may also be laser cut into the shim plates. In one embodiment, the shim plates may be formed of stainless steel, or other similar, suitable material. Accordingly, manufacturing time of the die assembly may be significantly reduced by reducing or eliminating the need to machine fluid conduits, flow paths, plenums, channels and the like within the die plate. In addition, laser cutting the shims of the embodiments described above may significantly reduce manufacturing costs compared to machining of the die plate. Thus, by forming the flow paths in the desired pattern within the shim package 114, cost and time savings may be realized compared to known die assemblies where the flow path pattern is machined in one or both of the die plate and adapter. It is understood that the present disclosure is not limited to laser cutting the shim plates. For example, the shim plates may alternatively, or together with laser cutting, be formed by die cutting, water jet cutting, blade cutting, milling, drilling and other suitable processes, or combination thereof.

Figure 3:
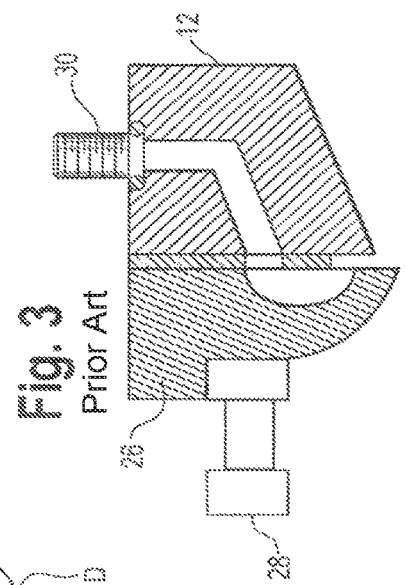
FIG. 3 is a side view of the die assembly of FIG. 1.
Figure 5:
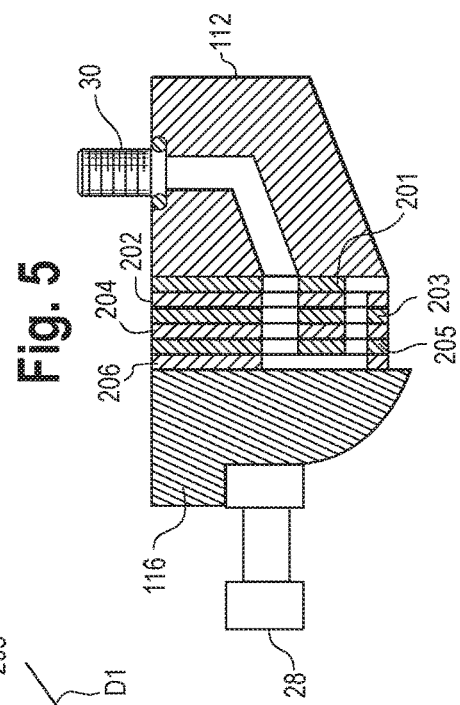
FIG. 5 is a cross-sectional view of the slot die assembly of FIG. 4, taken along line 5-5 of FIG. 4.

FIG. 5 is a side view of the slot die assembly 110 according an embodiment described herein. Referring to FIG. 5, the adapter body 112, shim package 114 and die plate 116 are disposed in series in abutting relationship. The adapter body 112, shim package 114 and die plate 116 may be clamped to one another with a first suitable fastener (not shown) such as a bolt, or the like, and the slot die assembly 110 may be secured to an adjacent component of an applicator with another suitable fastener (not shown), such as a bolt, or the like. In comparison to the known die assembly shown in FIG. 3, a width (shown left to right to FIGS. 3 and 5) of the laminated shim plate slot die assembly 110 of the present application, in one embodiment, may be slightly greater.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A slot die assembly for dispensing a hot melt adhesive onto an article, comprising:
   an adapter having a body having an adapter conduit configured to receive the hot melt adhesive;
   a shim package comprising a plurality of shim plates having a shim conduit disposed in fluid communication with the adapter conduit and configured to receive the hot melt adhesive from the adapter conduit, the shim package further comprising a connecting conduit disposed in fluid communication with the shim conduit, a reservoir disposed in fluid communication with the connecting conduit, and a single elongated slot disposed in direct fluid communication with the reservoir, the single elongated slot configured to dispense the hot melt adhesive from the slot die assembly; and
   a die plate disposed in abutting relationship to the shim package,
   wherein the shim conduit defines a portion of a hot melt adhesive flow path to direct the hot melt adhesive in a first direction from the adapter toward the die plate, the reservoir defining another portion of the hot melt adhesive flow path in a downward direction, the flow path defining a third, horizontal direction opposite to the first horizontal direction, and a further portion of the flow path out of the slot die assembly in a downward direction, and wherein the adhesive flow path is devoid of flow in an upward direction.

2. The slot die assembly of claim 1, wherein the hot melt adhesive flow path is defined by the adapter conduit, the shim conduit, the connecting conduit, the reservoir and the slot, and the hot melt adhesive flow path is not formed in the die plate.

3. The slot die assembly of claim 1, wherein the shim plates of the shim package are formed by one or more of laser cutting, die cutting, water jet cutting, blade cutting, milling and drilling.

4. The slot die assembly of claim 1, wherein the shim plates are made from stainless steel.

5. The slot die assembly of claim 1, wherein at least one of the body of the adapter and the die plate are made from hardened metal.

6. The slot die assembly of claim 1, wherein at least one of the body of the adapter and the die plate are made from tool steel.

7. The slot die assembly of claim 1, wherein the connecting conduit is configured to direct the hot melt adhesive substantially in a height direction.

8. The slot die assembly of claim 7, wherein the connecting conduit is configured to direct the hot melt adhesive substantially in a transverse direction.

9. The slot die assembly of claim 1, wherein the reservoir is configured to direct the hot melt adhesive substantially in a transverse direction.

* * * * *